Figure 1:
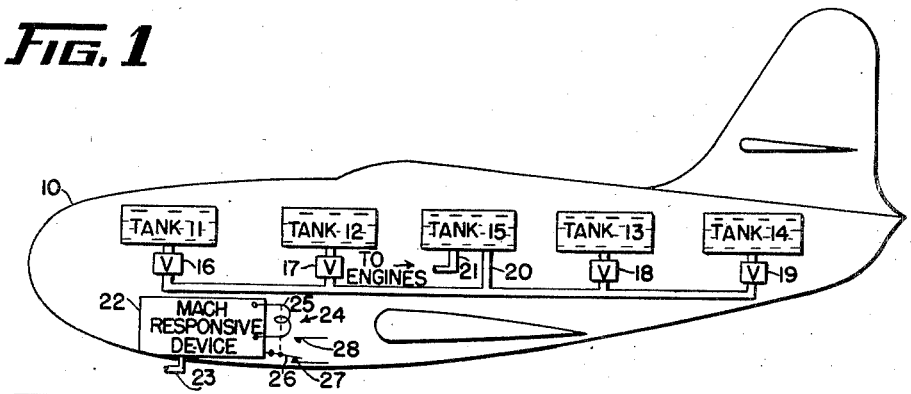

Feb. 18, 1958 R. L. BERGESON 2,823,880
AIRCRAFT FUEL LOAD CENTER OF GRAVITY CONTROL MEANS
Filed March 10, 1955 2 Sheets-Sheet 1

*INVENTOR.*
RAYMOND L. BERGESON
BY
*ATTORNEY*

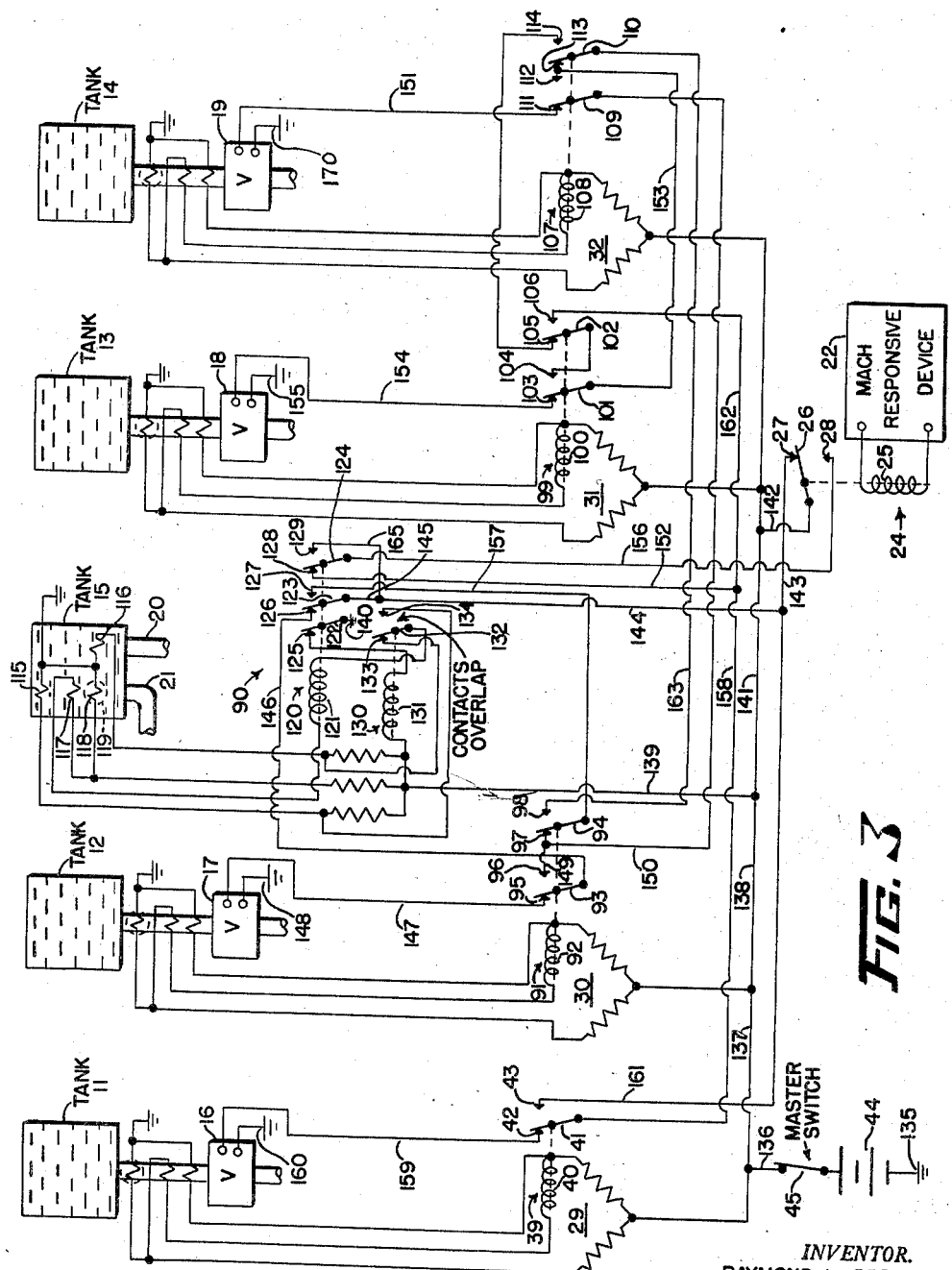

United States Patent Office 2,823,880
Patented Feb. 18, 1958

2,823,880

AIRCRAFT FUEL LOAD CENTER OF GRAVITY CONTROL MEANS

Raymond L. Bergeson, St. Paul, Minn., assignor to Minneapolis-Honeywell Regulator Company, Minneapolis, Minn., a corporation of Delaware Application March 10, 1955, Serial No. 493,426

11 Claims. (Cl. 244—135)

The present invention is concerned with a control apparatus and more particularly with a control apparatus for controlling the withdrawal of fuel from a plurality of aircraft fuel tanks so as to maintain the center of gravity of the aircraft within predetermined limits, the control apparatus having means to modify this control function in accordance with aircraft speed.

It has become almost common practice in the present day long-range, high speed aircraft to control the distribution of aircraft fuel in order to maintain the center of gravity of the aircraft within the optimum range.

The present day long-range aircraft have a plurality of fuel tanks located throughout the aircraft. Many of these fuel tanks of necessity are located a considerable distance from the desired center of gravity of the aircraft in order to provide additional quantities of fuel to extend the range of the aircraft. With the aircraft fully loaded with fuel, the fuel distribution must be such that the center of gravity of the aircraft is at a particular point on the aircraft which renders the aircraft satisfactorily flyable. It is well known that if the center of gravity of the aircraft reaches an extreme condition of unbalance, the aircraft can be flown only with great difficulty.

It is also well known that the flight characteristics of an aircraft vary with the speed of the aircraft. In other words, the desired range of center of gravity deviation for an aircraft changes as the speed of the aircraft increases. As a specific example, the flight characteristics of an aircraft may require that the center of gravity of the aircraft have a different position on the aircraft depending upon whether the speed is above or below the Mach 1 speed.

It is therefore an object of the present invention to provide a control apparatus to sequentially control the withdrawal of fuel from a plurality of fuel tanks within an aircraft to thereby maintain the center of gravity of the aircraft within a desired range and to further provide a speed responsive device to alter the scheduled withdrawal of fuel from the plurality of fuel tanks to thereby alter the controlled center of gravity of the aircraft in accordance with aircraft speed.

It is a further object of the present invention to provide a control system for use with an aircraft having a plurality of fuel tanks, having a plurality of fuel responsive devices one of which is associated with each of the fuel tanks, with the fuel responsive devices incorporated into a scheduling device to schedule the withdrawal of fuel from the plurality of fuel tanks to maintain the center of gravity of the aircraft in a desired range, and having speed responsive means responsive to the speed of the aircraft and effective to modify the scheduled withdrawal of fuel from the plurality of fuel tanks to thereby alter the control of the center of gravity in accordance with aircraft speed.

It is a further object of the present invention to provide a control apparatus for use with an aircraft having a plurality of individual fuel tanks with fuel flow means controlling the withdrawal of fuel from the individual fuel tanks to cause the fuel to flow to a main tank from which it flows to the aircraft power plant, having a scheduling apparatus to schedule the withdrawal of fuel from the individual tanks in a predetermined schedule to control the center of gravity of the aircraft, and having a fuel responsive device associated with the main tank and responsive to a predetermined minimum quantity of fuel in the main tank to alter the scheduled withdrawal of fuel from the individual tanks when one of the tanks fails to drain, as evidenced by the fuel quantity in the main tank reaching the predetermined minimum.

It is a further object of the present invention to provide a control apparatus for use with an aircraft having a plurality of fuel tanks, a main tank, and fuel flow control devices to control the flow of fuel from the individual tanks into the main tank from which it flows to the aircraft power plant, the apparatus having a scheduling device to schedule the withdrawal of fuel from the plurality of fuel tanks to control the center of gravity of the aircraft, a fuel responsive device associated with the main tank and responsive to a predetermined minimum quantity of fuel in the main tank to alter the scheduled withdrawal of fuel from the plurality of tanks whenever one of the plurality of tanks fails to drain as evidenced by the fuel quantity in the main tank reaching the predetermined minimum, and having a speed responsive device responsive to the speed of the aircraft and effective to alter the scheduled withdrawal of fuel from the plurality of tanks to thereby alter the control of the aircraft center of gravity in accordance with aircraft speed.

Figure 2:
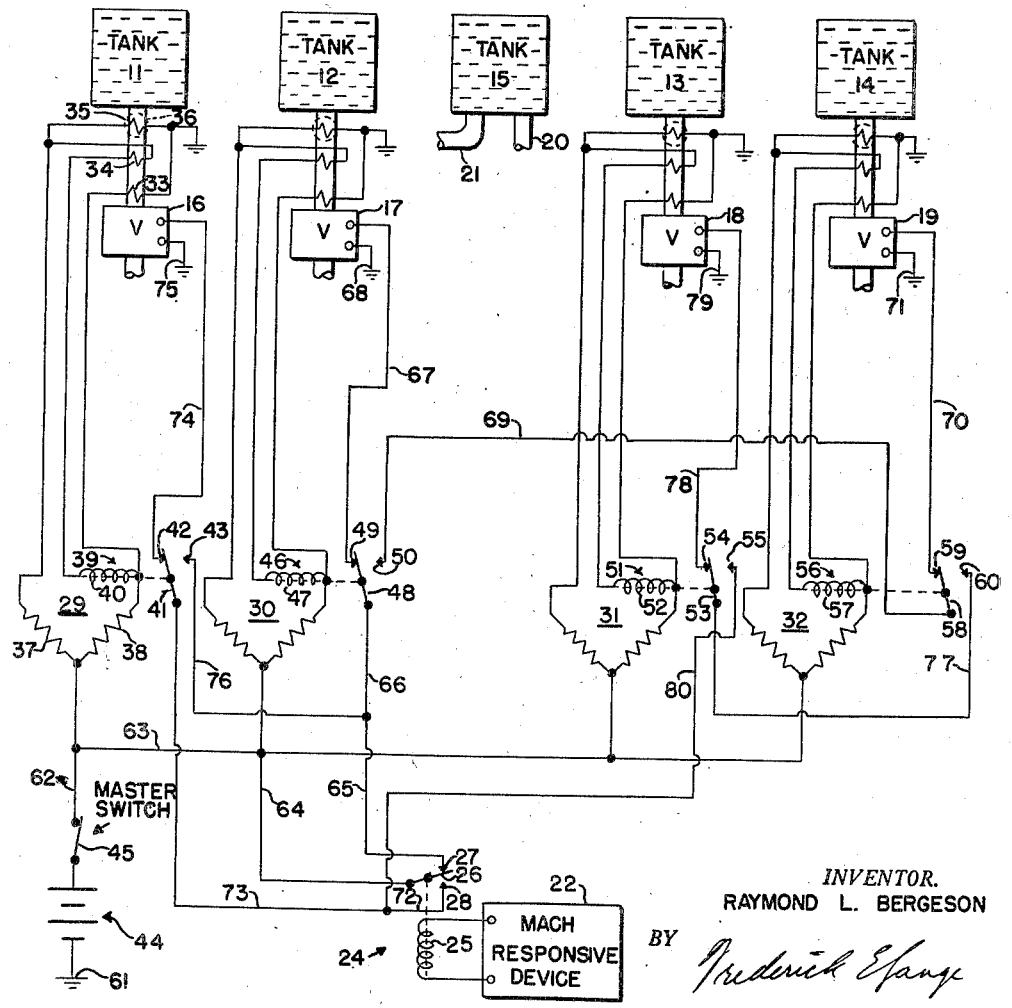

These and other objects of the present invention will be apparent to those skilled in the art upon reference to the following specification, claims, and drawings, of which Figure 1 is a silhouette outline of an aircraft showing a plurality of fuel tanks disposed within the aircraft and showing a Mach or speed responsive device, Figure 2 is a showing of the present invention providing for scheduling the withdrawal of fuel from the fuel tanks and including the Mach or speed responsive device, and Figure 3 is a showing of a modification of the present invention wherein a means responsive to the quantity of fuel in the main tank is provided to alter the scheduled withdrawal of fuel from the individual fuel tanks when one of the individual fuel tanks fails to drain.

Referring specifically to Figure 1, the reference numeral 10 designates the outline of an aircraft having disposed within a plurality of individual fuel tanks 11, 12, 13, and 14, and having a main fuel tank 15. The fuel tanks 11 through 15 are interconnected by a conduit or pipe network including the valves 16, 17, 18, and 19 associated with the fuel tanks 11, 12, 13, and 14 respectively. An inlet conduit 20 feeds fuel to the inlet of the main tank 15. The main tank is provided with an outlet conduit 21 which feeds the fuel to the aircraft engines. The aircraft 10 may be of any particular type. The invention is particularly adaptable for use with a pilotless aircraft.

The reference numeral 22 designates a speed or Mach responsive device. This Mach responsive device is provided with a pitot tube 23 which provides a means of detecting the aircraft speed. The Mach responsive device is effective to cause energization of a relay 24 having a winding 25 and a movable switch blade 26 cooperating with the stationary contacts 27 and 28. The relay 24 is shown in the de-energized position and in this position the switch blade 26 is biased, by means not shown, to engage stationary contact 27. The Mach responsive device 22 functions in a manner so that upon the aircraft reaching a predetermined speed the relay 24 is energized to cause the movable switch blade 26 to disengage contact 27 and move into engagement with contact 28. The Mach responsive device 22 may take a variety of forms. As an example, the structure shown in the Walter A. Andrews Patent 2,629,569 may be provided to perform this function.

Referring specifically to Figure 2, the reference numerals 29, 30, 31, and 32 designate four individual thermistor liquid level sensing devices, each individual device being such as shown in the copending application of Donald C. Johnson, Serial No. 459,702, filed October 1, 1954.

These thermistor level sensing devices are all identical in structure and operation and consist of a bridge circuit utilizing two resistors, three thermistors, and a relay. Referring to the level sensing apparatus 29, a sensing thermistor 33, a compensating thermistor 34, and a reference thermistor 35 are located in the outlet conduit of tank 11. The reference thermistor 35 is shielded from direct contact with fuel by means of the shield, represented by the broken line 36. The operation of the level sensing apparatus 29 is such that the bridge circuit, including the resistors 37 and 38 and the thermistors 33 and 35, is unbalanced whenever there is fuel in tank 11. The withdrawal of fuel from tank 11 is controlled by energization of the valve 16, and when tank 11 is completely drained, the bridge circuit will be balanced to de-energize a relay 39 having a winding 40 connected in the detecting leg of the bridge. Relay 39 includes movable switch blade 41, and stationary contacts 42 and 43. Since the tank 11 is shown in the full condition, the relay 39 is energized, the movable switch blade 41 engaging contact 42. Upon the bridge circuit becoming balanced, the relay 39 is de-energized and the movable switch blade 41 disengages contact 42 and moves into engagement with contact 43.

The energizing voltage for the thermistor level sensing devices 29 through 32 is derived from a source of voltage 44 and the level sensing devices are energized upon a master switch 45 being closed. In Figure 2, the master switch 45 is shown in the closed condition and all of the fuel tanks 11 through 15 are shown in the full condition. Therefore, the relays associated with the thermistor level sensing devices are shown in their energized condition.

The reference numeral 46 designates a relay associated with the thermistor level sensing device 30. This relay has a winding 47, movable switch blade 48, and stationary contacts 49 and 50. The relay is shown in the energized condition wherein movable switch blade 48 engages contact 49. Upon de-energization of the relay, the movable switch blade 48 disengages contact 49 and then moves into engagement with contact 50.

The reference numeral 51 designates a relay associated with the thermistor level sensing device 31. This relay has a winding 52, a movable switch blade 53, and stationary contacts 54 and 55. The relay 51 is shown in the energized condition wherein movable switch blade 53 engages contact 54. Upon de-energization of relay 51 the movable switch blade 53 disengages contact 54 and then moves into engagement with contact 55.

The reference numeral 56 designates a relay associated with the thermistor level sensing device 32. This relay has a winding 57, a movable switch blade 58, and stationary contacts 59 and 60. The relay 56 is shown in its energized condition wherein the movable switch blade 58 engages contact 59. Upon de-energization of relay 56, the movable switch blade 58 disengages contact 59 and then moves into engagement with contact 60.

As discussed above, the present invention is concerned with a control apparatus for controlling the flow of fuel from the fuel tanks of an aircraft in a predetermined scheduled sequence. In explaining the operation of Figure 2, it is to be noted that the desired sequence of operation is to first drain tank 12, after which tank 14 will be drained, after which tank 13 will be drained. After tank 13 has completed draining tank 11 will be drained if tank 11 has not drained prior to this time in response to the Mach responsive device 22 actuating relay 24, as will be described. The last tank to drain is the main tank 15.

In this particular example, the characteristics of the aircraft 10 are such that the fuel in the tank 11 is intended to serve as ballast until the speed of the aircraft has reached a predetermined value, for example the Mach 1 speed, in order to control the aircraft center of gravity. It is to be noted that while tank 11 in this particular example is shown as the forward tank and is the tank to be drained only when the other tanks 12, 13, or 14 are empty or when the aircraft reaches the Mach 1 speed, this particular tank could be located in any position within the aircraft, depending upon the characteristics of the aircraft.

Referring specifically to Figure 2, it will be assumed that the aircraft has just become airborne. In this condition, the fuel is being fed from the outlet 21 of main tank 15 to the engines and fuel is being fed to the inlet 20 of the main tank 15 from the tank 12. In order for this condition to exist, the valve 17 located in the outlet line of tank 12 must be energized. This energizing circuit can be seen by tracing a circuit from the ground connection 61 through power source 44, master switch 45, conductors 62, 63, and 64, switch blade 26 and contact 27, conductors 65 and 66, switch blade 48 and contact 49, conductor 67, valve 17, and ground connection 68. It will be noted that the above traced circuit is completed through the switch blade 26 and contact 27 of relay 24, which relay is controlled by the Mach responsive device 22. The above traced circuit will continue to energize valve 17 so long as fuel remains in the tank 12 to cause the thermistor level sensing device 30 to retain relay 46 in the energized condition and so long as the speed of the aircraft does not exceed the Mach 1 speed.

In this particular example, it will be assumed that the aircraft 10 does not exceed the Mach 1 speed as tank 12 is draining. Upon the tank 12 being completely drained, the thermistor level sensing device 30 will have its bridge circuit balanced and the relay 46 will become de-energized. This will cause the movable switch blade 48 to disengage contact 49 and to move into engagement with contact 50. This completes an energizing circuit for the valve 19 located in the outlet conduit of the tank 14. This energizing circuit can be traced from ground connection 61 through power source 44, master switch 45, conductors 62, 63 and 64, movable switch blade 26 and contact 27, conductors 65 and 66, movable switch blade 48 and contact 50, conductor 69, movable switch blade 58 and contact 59, conductor 70, valve 19, and ground connection 71. Energization of valve 19 causes tank 14 to be drained to the inlet 20 of tank 15.

The apparatus will continue operating in this manner until the tank 14 is empty or until the speed of the aircraft reaches the Mach 1 speed. If it is assumed that the speed of the aircraft increases to the Mach 1 speed before the tank 14 is completely drained, the relay 24, associated with the Mach responsive device 22, will be energized before the relay 56 associated with the thermistor level sensing device 32 is de-energized. Upon energization of relay 24, the energizing circuit for the valve 19, which includes the movable switch blade 26 and contact 27 of relay 24, is broken to de-energize the valve 19 and stop the draining of fuel from the tank 14. At the same time, the movable switch blade 26 engages contact 28 to complete an energizing circuit for the valve 16 associated with the tank 11.

This energizing circuit can be seen by tracing a circuit from ground connection 61 through power source 44, master switch 45, conductors 62, 63 and 64, switch blade 26 and contact 28, conductors 72 and 73, switch blade 41 and contact 42, conductor 74, valve 16, and ground connection 75. The energization of valve 16 causes the fuel in tank 11 to be drained to the tank 15 from where it is supplied to the aircraft engine.

The draining of tank 11 will continue until the tank 11 is either empty, to cause relay 39 associated with the thermistor level sensing device 29 to be de-energized, or until the speed of the aircraft 10 decreases to below the Mach 1 speed to cause the relay 24 to be de-energized.

It will be assumed that the speed of the aircraft 10 will remain above the Mach 1 speed until the tank 11 is completely drained. When tank 11 is completely drained the relay 39 associated with a thermistor level sensing device 29 is de-energized. De-energization of relay 39 causes movable switch blade 41 to disengage contact 42 and to move into engagement with contact 43. This completes an energizing circuit which allows the normal sequence of draining of the fuel tanks to be resumed.

It will be remembered that tank 14 was not completely drained of fuel when the speed of the aircraft exceeded the Mach 1 speed. Therefore, the valve 19 is once again energized. This energizing circuit can be seen by tracing a circuit from ground connection 61 through power source 44, master switch 45, conductors 62, 63 and 64, switch blade 26 and contact 28, conductors 72 and 73, switch blade 41 and contact 43, conductors 76 and 66, switch blade 48 and contact 50, conductor 69, switch blade 58 and contact 59, conductor 70, valve 19, and ground connection 71. Therefore, the fuel remaining in tank 14 will be supplied to tank 15.

It will be noted that with tank 11 empty so as to render the relay 39 de-energized, the valve 19 will remain energized until tank 14 is empty even though the speed of the aircraft may decrease to below a Mach 1 speed to de-energize the relay 24. So long as relay 24 remains energized the above traced circuit will be completed. If the speed of the aircraft is reduced to below the Mach 1 speed the movable switch blade 26 will disengage contact 28 and then engage contact 27 to complete the initial energizing circuit for valve 19, above traced.

Upon the tank 14 being completely drained of fuel, the thermistor level sensing device 32 associated with tank 14 will cause relay 56 to be de-energized. De-energization of relay 56 completes an energizing circuit for the valve 18 associated with the fuel tank 13. This circuit can be seen by tracing a circuit from the ground connection 61 through the power source 44, master switch 45, conductors 62, 63 and 64, switch blade 26 and contact 28, conductors 72 and 73, switch blade 41 and contact 43, conductors 76 and 66, switch blade 48 and contact 50, conductor 69, switch blade 58 and contact 60, conductor 77, switch blade 53 and contact 54, conductor 78, valve 18, and ground connection 79. Here again, it will be noted that the above traced circuit has been traced on the assumption that the speed of the aircraft remains above the Mach 1 speed to cause the relay 24 to be energized. However, if the speed of the aircraft is below the Mach 1 speed at this time the above traced energizing circuit will be modified to the extent that the connection from conductor 64 to conductor 66 is completed through switch blade 26, contact 27, and conductor 65. In any event, the valve 18 associated in the outlet conduit of tank 13 will be energized to cause the fuel from tank 13 to be supplied to the tank 15 and then supplied to the engines of the aircraft.

After a period of flight time has elapsed the tank 13 will be completely drained and the relay 51 associated with the thermistor level sensing device 31 will be de-energized. De-energization of relay 51 causes movable switch blade 53 to disengage contact 54 and to move into engagement with contact 55.

With the operation as above described, the engagement of movable switch blade 53 with contact 55 would have no effect at this time since, as above described, the fuel tank 11 is empty at this time. However, it is possible to have operation of the aircraft 10 wherein the Mach 1 speed is not reached or wherein the Mach 1 speed is reached for limited intervals which are not of sufficient duration to cause the tank 11 to be completely drained.

It will be assumed for the purpose of explanation that the tank 11 has not been completely drained and that the aircraft speed is below Mach 1. Relay 24 will therefore be de-energized and relay 39 associated with the thermistor level sensing apparatus 29 will be energized, as it is shown in Figure 2. If this condition exists, the movable switch blade 53 when it engages contact 55 completes an energizing circuit for valve 16 to cause the remaining fuel in tank 11 to be supplied to the tank 15. This energizing circuit can be traced from ground connection 61 through power source 44, master switch 45, conductors 62, 63 and 64, switch blade 26 and contact 27, conductors 65 and 66, switch blade 48 and contact 50, conductor 69, switch blade 58 and contact 60, conductor 77, switch blade 53 and contact 55, conductors 80 and 73, switch blade 41 and contact 42, conductor 74, valve 16, and ground connection 75. It will be noted that the above traced circuit includes switch blade 26 and contact 27 of relay 24. This is true since it has been assumed that the speed of the aircraft is not above the Mach 1 speed and therefore the relay 24 will be de-energized.

The specific example selected for purpose of explanation is an example wherein the speed of the aircraft reached the Mach 1 speed when the tank 14 was not completely empty and was maintained at or above the Mach 1 speed until the tank 11 was completely drained. The apparatus of Figure 2 will however function in a great variety of manners to control the aircraft center of gravity, depending upon the manner in which the aircraft 10 is operated. It can be generally stated however that tank 12 is completely drained before tanks 14 or 13 are drained, tank 14 is the next tank to be completely drained, and tank 13 is the next tank to be completely drained. This is the predetermined schedule of draining of the fuel tanks of the aircraft and this schedule is modified to cause the tank 11 to be drained whenever the speed of the aircraft exceeds the Mach 1 speed. If the tank 11 is not completely drained before the speed of the aircraft is reduced to below a Mach 1 speed, the draining of fuel from the tank 11 is stopped and the sequence of draining of the tanks 12, 14, and 13 is resumed at whatever spot in the schedule of the draining of these tanks the aircraft originally entered the Mach 1 speed condition. Likewise, if the total time in which the aircraft is operating above the Mach 1 speed is not sufficient to cause the tank 11 to be drained, the tank 11 is completely drained after the tank 13 is empty.

As pointed out above, this particular sequencing of the draining of fuel from the tanks of the aircraft is necessary to maintain the center of gravity of the aircraft within a desired range of positions and this range of positions is modified or altered in accordance with the speed of the aircraft.

With the apparatus shown in Figure 2, it is possible that one of the valves associated with the fuel tanks 11 through 14 may fail to open. If this should happen, the fuel would not flow from the associated fuel tank and when the main tank 15 had completely drained, the aircraft would not have fuel which was available for the engines. Such a condition normally does not occur and a manually operable means could be provided to energize all of the valves to thereby have an uncontrolled flow of fuel to the main tank 15 if such a condition should arise. Also, it is possible to provide a thermistor level switch associated with tank 15 to sense a low level of fuel in this tank, which condition will occur if a tank fails to drain. The relay associated with this level switch could then be connected to energize all valves. The modification of Figure 3 provides automatic means to alter the sequence of the draining of the tanks 11 through 14 whenever the level of fuel in the tank 15 drops to a minimum value.

Referring specifically to Figure 3, the apparatus of Figure 3 is essentially the same as the apparatus of Figure 2 with the exception that a differential type thermistor level switch device 90 is provided and the thermistor level sensing devices 29 through 32 are provided with relays having additional switch blades and contacts. In Figure 3, the reference numerals of Figure 2 are utilized in some cases to point up the fact that the modifications of Figure 2 and Figure 3 have these elements in common.

In the apparatus of Figure 3, the thermistor level sensing device 30 is provided with a relay 91 having a winding 92, movable switch blades 93 and 94, and stationary contacts 95, 96, 97, and 98. Here again, the apparatus of Figure 3 is energized since master switch 45 is closed. It will be remembered that the thermistor level sensing devices 29 through 31 are unbalanced and cause the associated relays to be energized when the associated fuel tanks are full. The tanks of Figure 3 are shown in the full condition. Therefore, relay 91 is energized and the switch blades 93 and 94 engage contacts 95 and 97 respectively. Upon de-energization of the relay 91 the movable switch blades 93 and 94 disengage contacts 95 and 97 and move into engagement with contacts 96 and 98 respectively.

The thermistor level sensing device 31 is provided with a relay 99 having a winding 100, movable switch blades 101 and 102, and stationary contacts 103, 104, 105, and 106. Relay 99 is shown in the energized condition wherein the switch blades 101 and 102 engage contacts 103 and 105 respectively. Upon de-energization of relay 99, the switch blades 101 and 102 disengage the contacts 103 and 104 and move into engagement with the contacts 104 and 106 respectively.

The thermistor level sensing device 32 is provided with a relay 107 having a winding 108, movable switch blades 109 and 110, and stationary contacts 111, 112, 113, and 114. The relay 107 is shown in the energized condition wherein switch blades 109 and 110 engage contacts 111 and 113 respectively. Upon de-energization of relay 107, the switch blades 109 and 110 disengage the contacts 111 and 113 and move into engagement with contacts 112 and 114 respectively.

The reference numeral 90 designates the above mentioned differential type thermistor level sensing device, shown in the copending application of William R. Wilson, Serial No. 490,962, filed February 28, 1955.

The thermistor level sensing device 90 includes a first sensing thermistor 115 located at an upper level in the main tank 15, a second sensing thermistor 116 located at a lower level in the main tank 15, a compensating thermistor 117, and a reference thermistor 118 which is shielded by a shield represented by the broken line 119. Connected in series with the compensating thermistor 117 is a relay 120 having a winding 121, movable switch blades 122, 123, and 124, and stationary contacts 125, 126, 127, 128, and 129. The winding 121 is connected in series with the movable switch blade of a relay 130 having a winding 131, movable switch blade 132, and stationary contacts 133 and 134. With the main tank 15 full, as shown, the relays 130 and 120 are in the energized condition. In this condition the movable switch blade 132 engages contact 133. This connects the winding 121 of relay 120 as a detector to a bridge circuit including the lower sensing thermistor 116. Upon the de-energization of relay 130, the switch blade 132 disengages contact 133 and moves into engagement with contact 134. This connects the winding 121 of relay 120 as a detector to a bridge circuit including the upper sensing thermistor 115.

The energization of the winding 131 of relay 130 is controlled by the movable switch blade 122 of relay 120. When relay 120 is energized the movable switch blade 122 engages contact 125 to complete an energizing circuit for the relay 130. This energizing circuit can be seen by tracing a circuit from the ground connection 135 through the power source 44, master switch 45, conductors 136, 137, 138 and 139, winding 131, contact 125 and switch blade 122, and ground connection 140. This energizing circuit is broken whenever relay 120 is de-energized.

The complete description of the operation of the thermistor level sensing device 90 is contained in the above mentioned copending application of William R. Wilson. It is believed that it will suffice here to state that the device consists of two bridge circuits, one of which includes the upper sensing thermistor 115 and the other of which includes the lower sensing thermistor 116. The winding 121 of relay 120 is connected as a detector to one or the other of these two bridge circuits depending upon the state of energization of the relay 130. The state of energization of relay 130 is in turn controlled by the state of energization of relay 120. The associated switch contacts of the two relays 120 and 130 are so interconnected so as to cause the winding 121 to be connected to the bridge including the lower sensing thermistor 116 until the level of fuel in the tank 15 drops to this lower level. When the fuel in tank 15 reaches this lower level the bridge circuit including the sensing thermistor 116 becomes balanced and the relay 120 is de-energized. This de-energizes relay 130 and connects the winding 121 of relay 120 to the bridge circuit including the sensing thermistor 115. The relay 120 remains de-energized since the bridge circuit including the sensing thermistor 115 is balanced due to the fact that the fuel in tank 15 is at the lower level. When the fuel in tank 15 reaches the upper level, the bridge including sensing thermistor 115 becomes unbalanced to again energize relay 120. This energizes relay 130 and connects the winding 121 of relay 120 to the bridge circuit including the lower sensing thermistor 116, this being the condition shown in Figure 3.

The sequence of operation of the apparatus of Figure 3 is substantially identical to the operation of the apparatus of Figure 2. In other words, fuel tanks 12, 14, and 13 are drained in that order and this sequence of draining of the fuel tanks is altered or modified when the speed of the aircraft reaches or exceeds the Mach 1 speed. When the aircraft reaches or exceeds the Mach 1 speed the tank 11 is drained. Whenever the tank 11 is completely drained or whenever the speed of the aircraft reduces to below Mach 1 speed, the sequence of draining of the tanks 12, 14, and 13 is again initiated at whatever point in the sequence the aircraft reached the Mach 1 speed.

The apparatus of Figure 3 is shown in the energized condition. That is, the master switch 45 is closed. The fuel tanks 11 through 15 are shown completely full of fuel. Upon closing of the master switch 45, a circuit energizing the valve 17 associated with the fuel tank 12 is completed. This circuit can be traced from ground connection 135, power source 44, master switch 45, conductors 136, 137, 138, 141 and 142, switch blade 26 and contact 27, conductors 143, 144 and 145, switch blade 123 and contact 126, conductor 146, switch blade 93 and contact 95, conductor 147, valve 17, and ground connection 148. The energization of valve 17 causes fuel to be drained from tank 12 to tank 15 and thereby to the engines of the aircraft. When tank 12 is empty of fuel the thermistor lever sensing device 30 causes the relay 91 to be de-energized. The de-energization of relay 91 causes the movable switch blades 93 and 94 to move to their de-energized position and this completes an energizing circuit for the valve 19 associated with the tank 14.

This energizing circuit can be traced from the ground connection 135 through power source 44, master switch 45, conductors 136, 137, 138, 141 and 142, switch blade 26, and contact 27, conductors 143, 144 and 145, switch blade 123 and contact 126, conductor 146, switch blade 93 and contact 96, conductors 149 and 150, switch blade 109 and contact 111, conductor 151, valve 19, and ground connection 170.

Here again, it will be assumed that the speed of the aircraft reaches the Mach 1 speed, which results in energization of relay 24, before the tank 14 is completely empty. The energization of relay 24 in response to the aircraft reaching the Mach 1 speed causes the valve 16 associated with the tank 11 to be energized. This energizing circuit can be traced from ground connection 135 through power source 44, master switch 45, conductors 136, 137, 138, 141 and 142, switch blade 26 and contact 28, conductor 156, switch blade 124 and contact 128, conductors 152 and 158, switch blade 41 and contact 42, conductor 159, valve 16, and ground connection 160. The energization of valve 16 causes fuel to flow from the tank 11 to the main tank 15 and thereby to the engines of the aircraft.

Also at this time, the energization of the relay 24 in response to the speed of the aircraft reaching the Mach 1 speed breaks the energizing circuit for the valve 19 associated with the tank 14 to thereby stop the draining of tank 14.

If it is assumed that the speed of the aircraft remains at the Mach 1 speed for a sufficient length of time to completely drain the tank 11, the relay 39 associated with the thermistor level sensing device 29 will be de-energized. The de-energization of this relay completes a further energizing circuit for the relay 19 associated with the tank 14 so that the remaining fuel in tank 14 can at this time be drained from this tank. The energizing circuit can be traced from the ground connection 135 through the power source 44, master switch 45, conductors 136, 137, 138, 141 and 142, switch blade 26 and contact 28, conductor 156, switch blade 124 and contact 128, conductors 152 and 158, switch blade 42 and contact 43, conductors 161, 144 and 145, switch blade 123 and contact 126, conductor 146, switch blade 93 and contact 96, conductors 149 and 150, switch blade 109 and contact 111, conductor 151, valve 19, and ground connection 170.

When tank 14 is completely drained the relay 107 associated with the thermistor level sensing device 32 is de-energized. This completes an energizing circuit for the valve 18 associated with the tank 13. This energizing circuit can be seen by tracing a circuit from ground connection 135 through power source 44, master switch 45, conductors 136, 137, 138, 141 and 142, switch blade 26 and contact 28, conductor 156, switch blade 124 and contact 128, conductors 152 and 158, switch blade 41 and contact 43, conductors 161, 144, and 145, switch blade 123 and contact 126, conductor 146, switch blade 93 and contact 96, conductors 149 and 150, switch blade 109 and contact 112, conductor 153, switch blade 101 and contact 103, conductor 154, valve 18, and ground connection 155.

It will be noted that in the last two above traced circuits for valves 19 and 18 respectively the circuits have been completed through the switch blade 26 and the contact 28 of relay 24. This circuit exists so long as the speed of the aircraft remains above the Mach 1 speed. If at any time the speed of the aircraft reduces to below the Mach 1 speed, the relay 24 is de-energized and the two above traced circuits are completed through the switch blade 26 and the contact 27 of relay 24 as can be traced.

The operation of the apparatus of Figure 3 thus far has been identical to the operation of the apparatus of Figure 2. In other words, the fuel tank 12 was first drained, the fuel tank 14 was partially drained at which time the aircraft reached the Mach 1 speed to cause the tank 11 to be drained, the draining of tank 14 was then completed after which the draining of tank 13 occurred. Here again, any particular mode of operation could have been described wherein the speed of the aircraft may have varied above and below the Mach 1 speed so as to cause varying periods of energization of the tank 11 followed by a return to the predetermined sequencing of the tanks 12, 14, and 13.

If tank 11 is not completely drained at the time that tank 13 is completely drained, and if the speed of the aircraft is below the Mach 1 speed, the de-energization of relay 99 associated with the thermistor level sensing device 31 will complete an energizing circuit for the valve 16 associated with the tank 11. This energizing circuit can be seen by tracing a circuit from ground connection 35, through power source 44, master switch 45, conductors 136, 137, 138, 141 and 142, movable switch blade 26 and contact 27, conductors 143, 144, and 145, movable switch blade 123 and contact 126, conductor 146, movable switch blade 93, and contact 96, conductors 149 and 150, movable switch blade 109 and contact 112, conductor 153, movable switch blade 101 and contact 104, movable switch blade 102 and contact 106, conductors 162 and 158, movable switch blade 41 and contact 42, conductor 159, valve 16, and ground connection 160.

As has been pointed out, the function of the thermistor level sensing device 90 is to provide a means whereby the sequencing of the withdrawal of fuel from the plurality of fuel tanks may be altered whenever the particular fuel tank which should be draining has failed to drain, as evidenced by the fuel in the tank 15 reaching the lower level to uncover the sensing thermistor 116. To explain this mode of operation of the apparatus of Figure 3 it will be assumed that tank 12 has drained and that tank 14 fails to drain. It will also be assumed that the speed of the aircraft remains below the Mach 1 speed.

With these assumed conditions, the fuel in tank 14 will fail to drain to tank 15. Therefore, the fuel in tank 15 will drain to the aircraft engines and the level of fuel in the tank 15 will drop. As soon as the level of fuel has dropped to uncover the sensing thermistor 116 the relay 120 associated with the thermistor level sensing device 90 will be de-energized. De-energization of this relay completes an energizing circuit for the valve 18 associated with the tank 13. This energizing circuit can be seen by tracing a circuit from the ground connection 135 through power source 44, master switch 45, conductors 136, 137, 138, 141 and 142, switch blade 26 and contact 27, conductors 143, 144 and 145, switch blade 123 and contact 27, conductor 157, switch blade 94 and contact 98, conductor 163, switch blade 110 and contact 113, conductor 153, switch blade 101 and contact 103, conductor 154, valve 18, and ground connection 155. It will be noted that this circuit is traced through the switch means controlled by relay 91 in the de-energized position since it has been assumed that tank 12 has been drained and the circuit is also completed through the switch means of relay 107 in the energized position since it is assumed that tank 14 has failed to drain thereby causing the thermistor level sensing device 32 associated with this tank to maintain its relay in the energized condition.

The effect of the de-energization of relay 120 associated with thermistor level sensing device 90 is to alter the predetermined sequence of draining of the fuel tanks of the aircraft to cause the next tank in the sequence, tank 13, to be drained since tank 14 failed to drain.

Tank 13 will continue to drain until the level of fuel in the tank 15 reaches the upper level, covering the sensing thermistor 115. The sensing thermistors 115 and 116 are placed at different levels in the tank 15 to prevent rapid cycling of the relay 120 as the level of fuel in the tank 15 rises and falls. As soon as the level of fuel in the tank 15 reaches the level to cover the sensing thermistor 115 the relay 120 is again energized.

This breaks the above traced energizing circuit for the valve 18 associated with the fuel tank 13. The fuel tank 15 will again drain to cause the level of fuel in the tank 15 to drop. If the aircraft reaches the Mach 1 speed before thermistor 116 is uncovered, the valve 16 associated with the fuel tank 11 will again be energized to cause the fuel in this tank to be drained. This circuit energizing the valve 16 is identical to the above traced circuit for this valve.

Here again, only a particular mode of operation of the apparatus of Figure 3 has been described. Generally speaking, the apparatus of Figure 3 will function to drain the fuel tanks 12, 14, and 13 in that sequence. Likewise, when the speed of the aircraft is above the Mach 1 speed the tank 11 will be drained. A failure of one of the tanks 12, 14, or 13 to drain will cause the subsequent tank in the sequence to be drained. The draining of this tank will continue for a period until the level of fuel in the tank 15 covers the upper sensing thermistor 115. During this period, valve 16 will not be energized if the aircraft speed exceeds Mach 1. However, when the upper sensing thermistor 115 has been covered the tank 11 will be drained, providing fuel remains in the tank and providing the speed of the aircraft is above the Mach 1 speed. It is to be noted that in the apparatus of Figure 3 no provision has been made for draining the remaining fuel in the tank 11 if fuel remains in this tank after the tanks 12, 14, and 13 have been drained in that order. In many cases this is desirable since as was stated, the function of the fuel in the tank 11 is primarily for ballast when the speed of the aircraft is below the Mach 1 speed. In most cases the fuel in tank 11 will be completely drained by the time the fuel in tank 13 is completely drained since the aircraft will have operated above the Mach 1 speed for a sufficient length of time to completely drain tank 11.

From the above description it can be seen that an improved control apparatus for sequencing the withdrawal of fuel from a plurality of tanks in an aircraft has been provided and this improved control apparatus utilizes a speed or Mach responsive device to alter the predetermined sequence of draining of the fuel tank to modify the center of gravity control of the aircraft in accordance with aircraft speed. It is also seen, that as a modification, a means has been provided which is responsive to the failure of any particular tank to drain to then alter the sequence of draining of the plurality of fuel tanks.

These and other modifications of the present invention will be apparent to those skilled in the art and it is intended that the scope of the present invention be limited solely by the appended claims.

I claim as my invention:

1. Control apparatus for use with an aircraft having a plurality of fuel tanks, comprising; scheduling means arranged to control the draining of fuel from the plurality of tanks in a predetermined sequence to maintain the center of gravity of the aircraft in a desired range, means responsive to failure of one of the tanks to drain arranged to modify the sequence of said scheduling means, and speed responsive means responsive to the speed of the aircraft arranged to modify the sequence of said scheduling means to modify the center of gravity of the aircraft to compensate for a change in flight characteristics with speed of the aircraft.

2. Control apparatus for use with an aircraft, comprising; a plurality of fuel tanks, a main fuel tank, flow control means including valve means and conduit means arranged to control the flow of fuel from said fuel tanks to said main tanks and from said main tanks to the aircraft power plant, a plurality of fuel sensing means one of which is associated with each of said plurality of fuel tanks, scheduling means including said fuel sensing means arranged to control said valve means to cause said plurality of fuel tanks to drain individually in a predetermined sequence until empty at which time the draining of another of said plurality of fuel tanks is initiated, means responsive to a minimum quantity of fuel in said main tanks, means connecting said last named means in controlling relation to said scheduling means to alter the schedule of draining of said plurality of fuel tanks if one of said tanks fails to drain as evidenced by the quantity of fuel in said main tank reaching said minimum quantity, means responsive to the speed of the aircraft, and means connecting said last named means to said scheduling means to alter the schedule of draining of said plurality of fuel tanks in order to compensate for a change in flight characteristics of the aircraft with an increased speed.

3. Control apparatus for use with an aircraft having a plurality of fuel tanks, comprising; a plurality of fuel responsive means one of which is associated with each fuel tank and each of which includes switch means actuated when the associated tank is empty, valve means for each fuel tank, circuit means interconnecting said valve means and said switch means in a manner to normally cause the fuel tanks to be drained in a predetermined sequence to thereby maintain the proper flight characteristics of the aircraft, and aircraft speed responsive means including further switch means connected to said circuit means to alter said predetermined sequence of draining to thereby alter the flight characteristics of the aircraft in accordance with aircraft speed.

4. Control apparatus for use with an aircraft comprising; a fuel storage system including a plurality of fuel tanks and a main tank with interconnecting fuel flow means including valve means to cause the fuel to flow from said plurality of fuel tanks under the control of said valve means to said main tank and from said main tank to the aircraft propulsion means, a plurality of fuel responsive means one of which is associated with each of said plurality of fuel tanks and each having switching means controlled in accordance with the presence or absence of fuel in the associated fuel tank, circuit means interconnecting said valve means and said switch means and arranged to cause said fuel tanks to individually drain into said main tank in a predetermined sequence to thereby control the center of gravity of the aircraft, further fuel responsive means associated with said main tank and having further switching means controlled in accordance with the presence or absence of a given quantity of fuel in said main tank, and means connecting said further switching means to said circuit means to alter the predetermined sequence of draining of said tanks when one of said tanks fails to drain as evidenced by the absence of a given quantity of fuel in said main tank.

5. Control apparatus for use with an aircraft comprising; a fuel storage system including a plurality of fuel tanks and a main tank with interconnecting fuel flow means including valve means to cause the fuel to flow from said plurality of fuel tanks under the control of said fuel flow means to said main tank and from said main tank to the aircraft propulsion means, a plurality of fuel responsive means one of which is associated with each of said plurality of fuel tanks and each having switching means controlled in accordance with the presence or absence of fuel in the associated fuel tanks, circuit means interconnecting said fuel flow means and said switch means and arranged to cause said fuel tanks to individually drain into said main tanks in a predetermined sequence to thereby control the center of gravity of the aircraft, further fuel responsive means associated with said main tank and having further switching means controlled in accordance with the presence or absence of a given quantity of fuel in said main tank, means connecting said further switching means to said circuit means to alter the predetermined sequence of draining of said tanks when one of said tanks fails to drain as evidenced by the absence of a given quantity of fuel in said main tank, and aircraft speed responsive means including switching means connected to said circuit means to alter the predetermined sequence of draining of said tanks to thereby change the control of aircraft center of gravity as a function of the speed of the aircraft.

6. Control apparatus for use with an aircraft comprising; a fuel storage system including a plurality of fuel tanks with interconnecting fuel flow means including valve means to cause the fuel to flow from said plurality of fuel tanks under the control of said valve means to the aircraft propulsion means, a plurality of fuel responsive means one of which is associated with each of said plurality of fuel tanks and each having switching means controlled in accordance with the presence or absence of fuel in the associated fuel tank, circuit means interconnecting said valve means and said switch means and arranged to cause said fuel tanks to individually drain in a predetermined sequence to thereby control the center of gravity of the aircraft, further fuel responsive means associated with a portion of said flow means through which the fuel from all of said tanks must flow, said further fuel responsive means having further switching means controlled in accordance with the presence or absence of fuel at said portion of said flow means, and means connecting said further switching means to said circuit means to alter the predetermined sequence of draining of said tanks when one of said tanks fails to drain as evidenced by the absence of fuel at said portion of said flow means.

7. Control apparatus for use with an aircraft having a plurality of fuel tanks, comprising, scheduling means arranged to control the draining of the fuel tanks in a manner to control the center of gravity of the aircraft, aircraft speed responsive means effective to produce a control effect at a predetermined aircraft speed, and means responsive to the control effect of said aircraft speed responsive means to modify said scheduling means to thereby alter the sequence of draining of the fuel tanks when the aircraft reaches a predetermined speed to take into account the change in flight characteristics of the aircraft with speed.

8. Control apparatus for use with an aircraft having a plurality of fuel tanks for controlling the draining of fuel from the tanks, comprising, a plurality of fuel responsive means arranged one with each of the plurality of fuel tanks, each of said fuel responsive means being effective to produce a control effect when its fuel tank is empty, scheduling means interrelating said fuel responsive means to cause the fuel tanks to be drained in a predetermined sequence, speed responsive means responsive to the speed of the aircraft and effective to produce a control effect at a predetermined speed, and means responsive to the control effect of said speed responsive means to modify said scheduling means to thereby alter the sequence of draining of the fuel tanks when the aircraft reaches the predetermined speed to take into account the change in flight characteristics of the aircraft with speed.

9. Control apparatus for use with a vehicle whose operating characteristics change with speed and with vehicle load, comprising, a plurality of variable controllable loads for the vehicle, scheduling means arranged to control said plurality of loads in a predetermined manner to thereby maintain a desired range of operating characteristics for the vehicle, speed responsive means responsive to the speed of the vehicle and effective to produce a control effect at a predetermined speed, and means responsive to the control effect of said speed responsive means to modify said scheduling means to alter the predetermined manner of control of said plurality of loads and to thereby alter the desired range of operating characteristics for the vehicle in accordance with vehicle speed.

10. Control apparatus for use with an aircraft, comprising, a plurality of fuel tanks disposed throughout the aircraft, interconnecting conduit means including valve means whereby the fuel in said tanks can be drained to a main tank and then into the aircraft power means, scheduling means connected to said valve means to control the fuel flow to maintain a desired range of center of gravity characteristics for the aircraft, speed responsive means responsive to the speed of the aircraft and effective to produce a control effect at a predetermined speed, and means responsive to the control effect of said speed responsive means to modify said scheduling means and to thereby vary the range of center of gravity of the aircraft to take into account the changes in flight characteristics of the aircraft with speed.

11. Control apparatus for use with an aircraft, comprising, a plurality of fuel tanks disposed throughout the aircraft, interconnecting conduit means whereby the fuel in said tanks can be drained to a main tank and then to the aircraft power means, scheduling means arranged to control the draining of fuel to the main tank from the remainder of said tanks in a predetermined sequence to maintain the center of gravity of the aircraft in a desired range, and liquid level responsive means associated with said main tank, said liquid level responsive means responsive to failure of any one of the tanks to drain into said main tank and arranged to modify the sequence of said scheduling means upon said failure.

References Cited in the file of this patent
UNITED STATES PATENTS
2,406,854    Samiran _____ Sept. 3, 1946

UNITED STATES PATENT OFFICE
CERTIFICATE OF CORRECTION

Patent No. 2,823,880                                  February 18, 1958

Raymond L. Bergeson

It is hereby certified that error appears in the printed specification of the above numbered patent requiring correction and that the said Letters Patent should read as corrected below.

Column 10, line 50, for "contact 27" read -- contact 127 --; column 14, line 46, after "said failure." insert the following claim:

-- 12. Control apparatus for use with an aircraft, comprising, a plurality of fuel tanks disposed throughout the aircraft, interconnecting conduit means whereby the fuel in said tanks can be drained to a main tank and then to the aircraft power means, scheduling means arranged to control the draining of fuel to the main tank from the remainder of said tanks in a predetermined sequence to maintain the center of gravity of the aircraft in a desired range, and liquid level responsive means associated with said main tank, said liquid level responsive means responsive to a predetermined condition of the level of the fuel in said main tank to modify the sequence of said scheduling means. --;in the heading to the printed specification, line 8, for "11 Claims." read -- 12 Claims. --.

Signed and sealed this 29th day of April 1958.

(SEAL)
Attest:

KARL H. AXLINE                                                        ROBERT C. WATSON
Attesting Officer                                       Commissioner of Patents